(12) United States Patent
Ichino (10) Patent No.: US 7,068,442 B2
(45) Date of Patent: Jun. 27, 2006

(54) LENS APPARATUS AND IMAGE-TAKING APPARATUS

(75) Inventor: Kazushige Ichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 10/958,315

(22) Filed: Oct. 5, 2004

(65) Prior Publication Data

US 2005/0057823 A1 Mar. 17, 2005

Related U.S. Application Data

(62) Division of application No. 10/784,847, filed on Feb. 23, 2004, now Pat. No. 6,822,810.

(30) Foreign Application Priority Data

Feb. 26, 2003 (JP) .............................. 2003/048806

(51) Int. Cl.
*G02B 15/14* (2006.01)
(52) U.S. Cl. ...................... 359/696; 359/697; 359/698; 359/699; 359/700; 359/701; 359/704; 359/819; 359/822; 359/823; 359/826; 359/829
(58) Field of Classification Search ........ 359/696–701, 359/704, 819, 822–823, 826, 829–830
See application file for complete search history.

(56) References Cited

U.S. PATENT DOCUMENTS

| 4,154,510 | A | * | 5/1979 | Katagiri | 359/826 |
|---|---|---|---|---|---|
| 6,115,197 | A | * | 9/2000 | Funahashi | 359/826 |
| 6,369,962 | B1 | * | 4/2002 | Nomura et al. | 359/822 |
| 6,392,828 | B1 | * | 5/2002 | Nomura et al. | 359/827 |
| 6,522,478 | B1 | * | 2/2003 | Nomura et al. | 359/694 |
| 6,522,482 | B1 | * | 2/2003 | Nomura et al. | 359/701 |
| 6,751,032 | B1 | * | 6/2004 | Nomura et al. | 359/819 |
| 2001/0026401 | A1 | * | 10/2001 | Koiwai et al. | 359/699 |
| 2002/0135887 | A1 | * | 9/2002 | Nomura et al. | 359/699 |
| 2002/0135898 | A1 | * | 9/2002 | Nomura et al. | 359/819 |
| 2003/0117725 | A1 | * | 6/2003 | Nomura et al. | 359/819 |

FOREIGN PATENT DOCUMENTS

JP H07(1995)-043584 2/1995

\* cited by examiner

*Primary Examiner*—Evelyn A. Lester
(74) *Attorney, Agent, or Firm*—Cowan, Liebowitz & Latman, P.C.

(57) ABSTRACT

A lens apparatus which is easy to assemble, provides high strength at the flange portion, and achieves high degree of design freedom, too, is disclosed. The lens apparatus comprises first and second members. The first member has a guide portion to guide the member straight ahead in an optical axis direction. The second member is arranged outside the first member and has a circumferential wall, on which an engaging portion for guiding the guide portion is formed. An opening portion is also formed at the end of the optical axis direction of the second member at a different position from the engaging portion and connected with the engaging portion. The opening portion takes the guide portion in and out with respect to the second member.

4 Claims, 6 Drawing Sheets

LENS APPARATUS AND IMAGE-TAKING APPARATUS

CROSS-REFERENCE TO RELATED APPLICATIONS

This application is a divisional of application Ser. No. 10/784,847, filed Feb. 23, 2004 now U.S. Pat. No. 6,822,810.

BACKGROUND OF THE INVENTION

1. Field of the Invention

The present invention relates to a barrel mounted to image-taking apparatus such as silver halide camera and digital still cameras, and more specifically video cameras, etc.

2. Description of the Related Art

Figure 6:
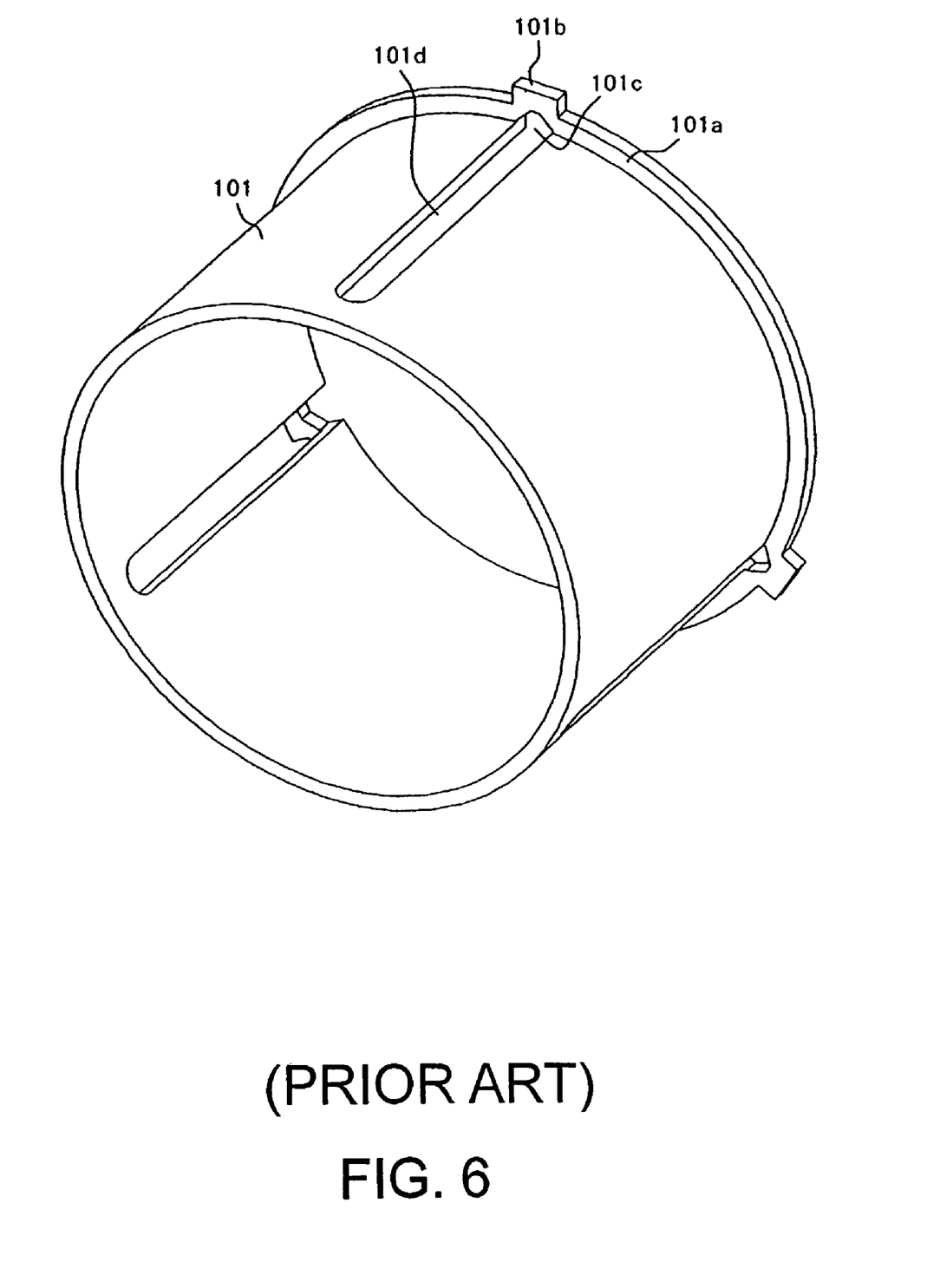
FIG. 6 is a perspective view of a conventional rectilinear barrel.

FIG. 6 shows a barrel of a conventional camera (see Japanese Patent Application Laid-Open Publication No. H07(1995)-043584). In the figure, numeral 101 denotes a rectilinear barrel, and this rectilinear barrel 101 is positioned inside a differential barrel not illustrated. When this differential barrel moves in the optical axis direction while the differential barrel rotates around the optical axis, the rectilinear barrel 101 moves in the optical axis direction in linkage with the movement of the differential barrel while the rectilinear barrel 101 does not rotate around the optical axis.

To the rectilinear barrel 101, three guide groove portions 101d extending along the optical axis direction are located at nearly even intervals. To guide the groove portion 101d, a cam pin (not illustrated) mounted to a lens holding member to be assembled inside the rectilinear barrel 101 is engaged.

At the rear end portion of the rectilinear barrel 101, a flange portion 101a that extends along the circumferential direction of the rectilinear barrel 101 is positioned. At the position of the phase same as that of the guide groove portion 101d of the flange portion 101a, an opening 101c for passing the cam pin is provided. When a lens holding member is assembled to the rectilinear barrel 101, the cam pin can be guided to guide the groove portion 101d in such a manner as to pass the opening portion 101c from the rear side of the rectilinear barrel 101.

In addition, to the flange portion 101a, a protruded portion 101b is positioned at the location of the phase same as that of the opening portion 101c. This protruded portion 101b prevents the rectilinear barrel 101 from rotating around the optical-axis by engaging with a rectilinear groove portion formed in a fixed barrel (either not illustrated).

As described above, in the conventional lens barrel, the opening portion 101c and the protruded portion 101b are arranged at the position of the same phase. This is because strength is weakened at the place where the opening portion 101c of the flange portion 101a is formed because the size in the height direction of the flange portion is shortened. That is, the protruded portion 101b is arranged at the position of the phase same as that of the opening portion 101 and the strength of the flange portion 101a is prevented from being degraded.

However, if it is mandatory to arrange the protruded portion 101b at the position of the phase same as that of opening portion 101c, the degree of design freedom is impaired. That is, the protruded portion 101b must be arranged in such a manner as to engage with the rectilinear groove portion formed in the fixed barrel. Consequently, the opening portion 101c, the guide groove portion 101d, the protruded portion 101b, and the rectilinear groove portion of the fixed barrel must be arranged at the position of the same phase. This may impair the degree of design freedom.

SUMMARY OF THE INVENTION

It is an object of the present invention to provide a lens apparatus which is easy to assemble and at the same time which achieves a high degree of design freedom while securing sufficient strength at the flange portion.

The lens apparatus which is one aspect of the present invention comprises a first member, which has a guide portion guided so that the first member goes straight ahead in an optical axis direction, and a second member, which is arranged outside of the first member. The second member has a circumferential wall with an engaging portion for guiding the guide portion in the optical axis direction formed on the circumferential wall. In the second member, an opening portion is formed at the end of the optical axis direction of the second member to take the guide portion in and out with respect to the second member. The opening portion and the engaging portion are connected but are formed at different positions in the circumferential direction. In addition, the lens apparatus further comprises a flange portion formed at the end of the optical axis direction of the second member, where the opening member is also formed at the flange portion.

It is a further object of the present invention to provide an image-taking apparatus comprising the lens apparatus and a photoelectric conversion element which photoelectrically converts an object formed by the lens apparatus. The lens apparatus comprises a first barrel member with a guide portion guided in an optical axis and a second barrel member with a circumferential wall and having a first engaging portion formed on the circumferential wall for guiding the guide portion in the optical axis direction, a flange portion formed at the end of the optical axis direction of the circumferential wall, an opening portion formed on the flange portion such that the opening portion and the first engaging portion are formed at different positions, and a second engaging portion for connecting the first engaging portion and the opening portion formed on the circumference wall.

The features of the lens apparatus and image-taking apparatus according to the present invention will become more apparent from the following description taken in connection with the accompanying drawings.

DETAILS DESCRIPTION OF THE PREFERRED EMBODIMENTS

Referring now to drawings, embodiments of the present invention will be described in detail as follows.

Figure 5:
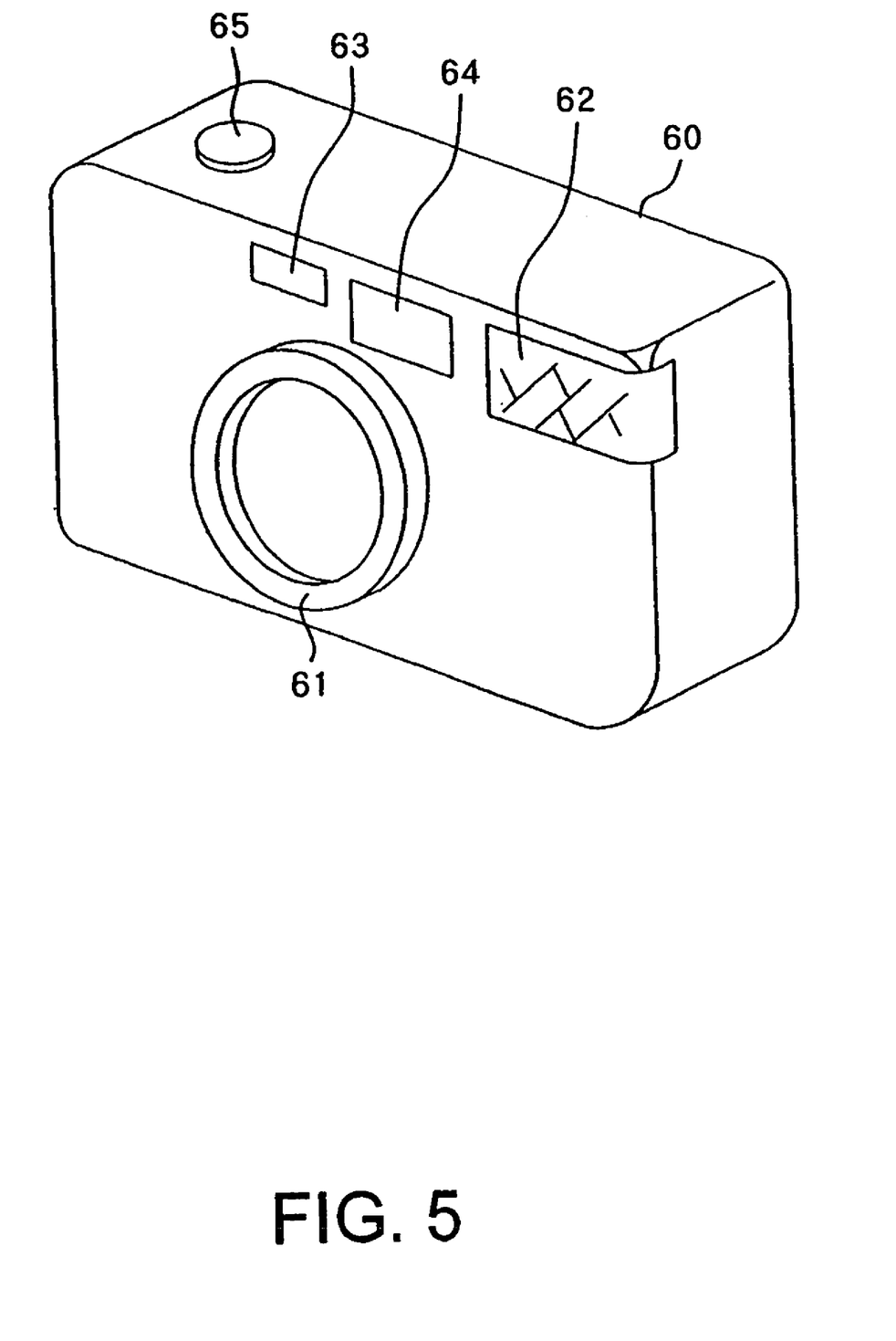
FIG. 5 is an external view of a camera to which the lens barrel of the present embodiment is mounted.

First of all, FIG. 5 is an external view of a camera equipped with a lens barrel according to the present embodiment. In FIG. 5, numeral 60 denotes a camera body, and at the front center of this camera body 60, a lens barrel 61 which can zoom is placed.

Figure 1:
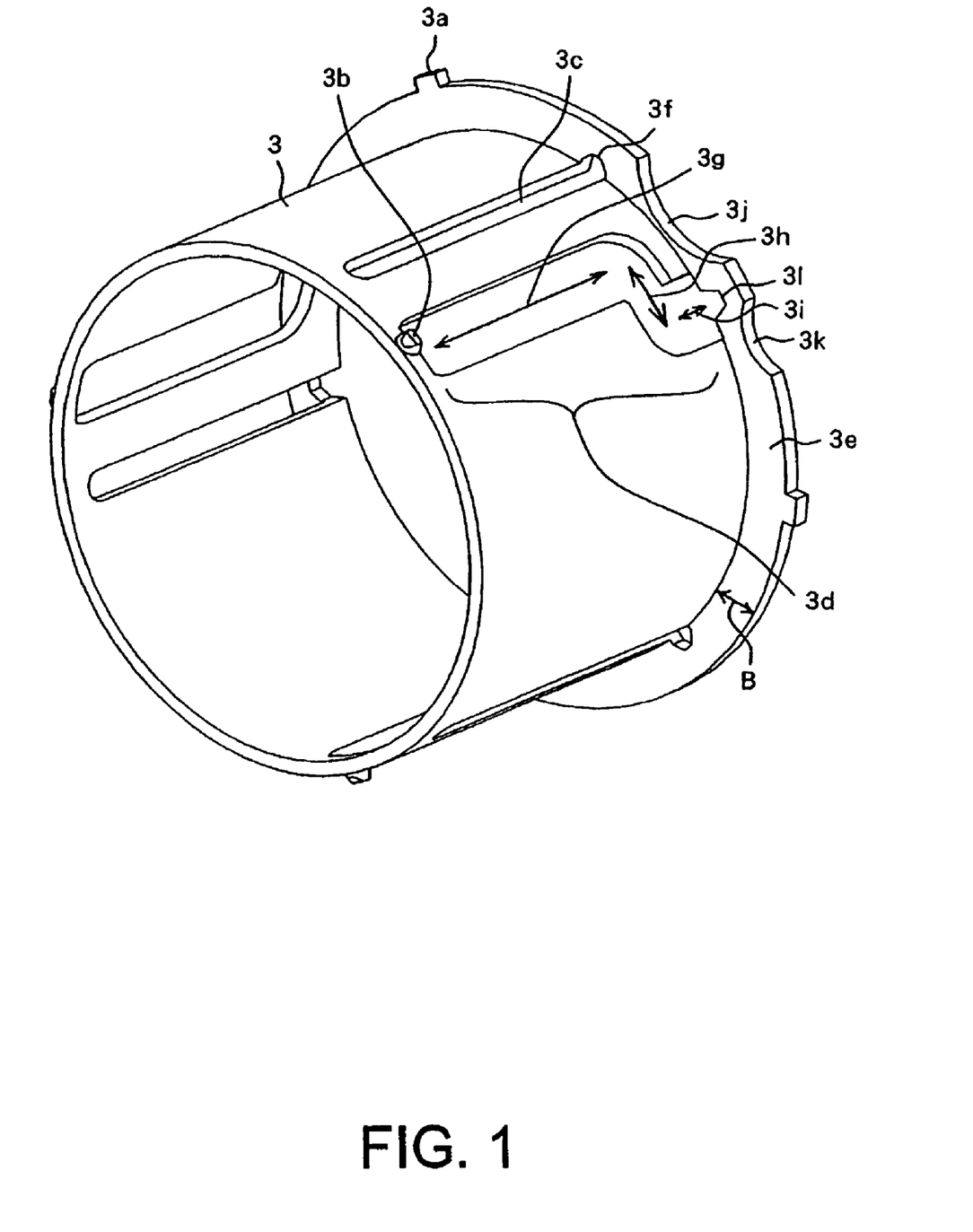
FIG. 1 is a perspective view of the rectilinear barrel comprising the lens barrel of the present embodiment.
Figure 2:
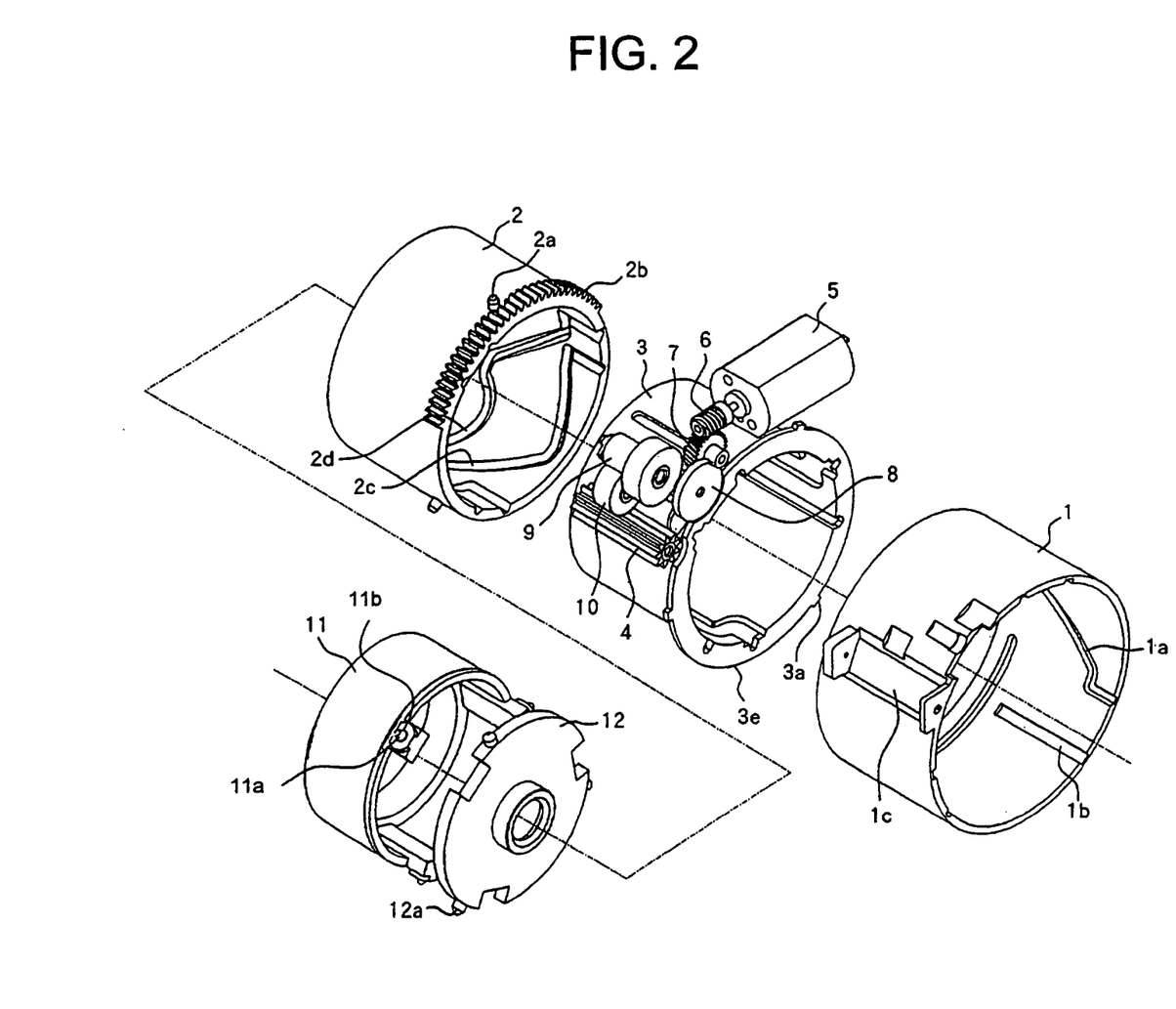
FIG. 2 is an exploded view in perspective of the lens barrel of the present embodiment.
Figure 3:
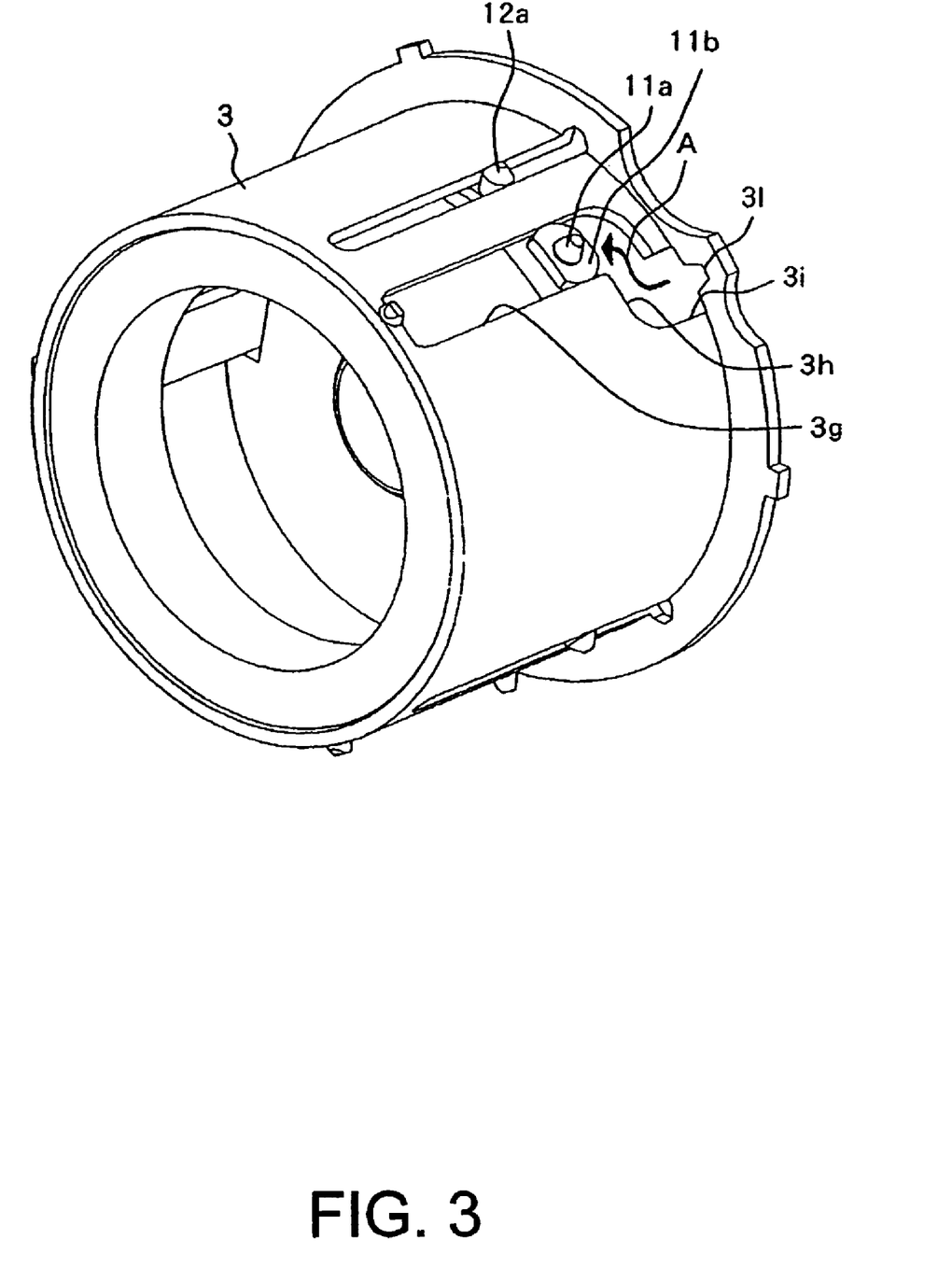
FIG. 3 is a perspective view of the rectilinear barrel of the present embodiment.
Figure 4:
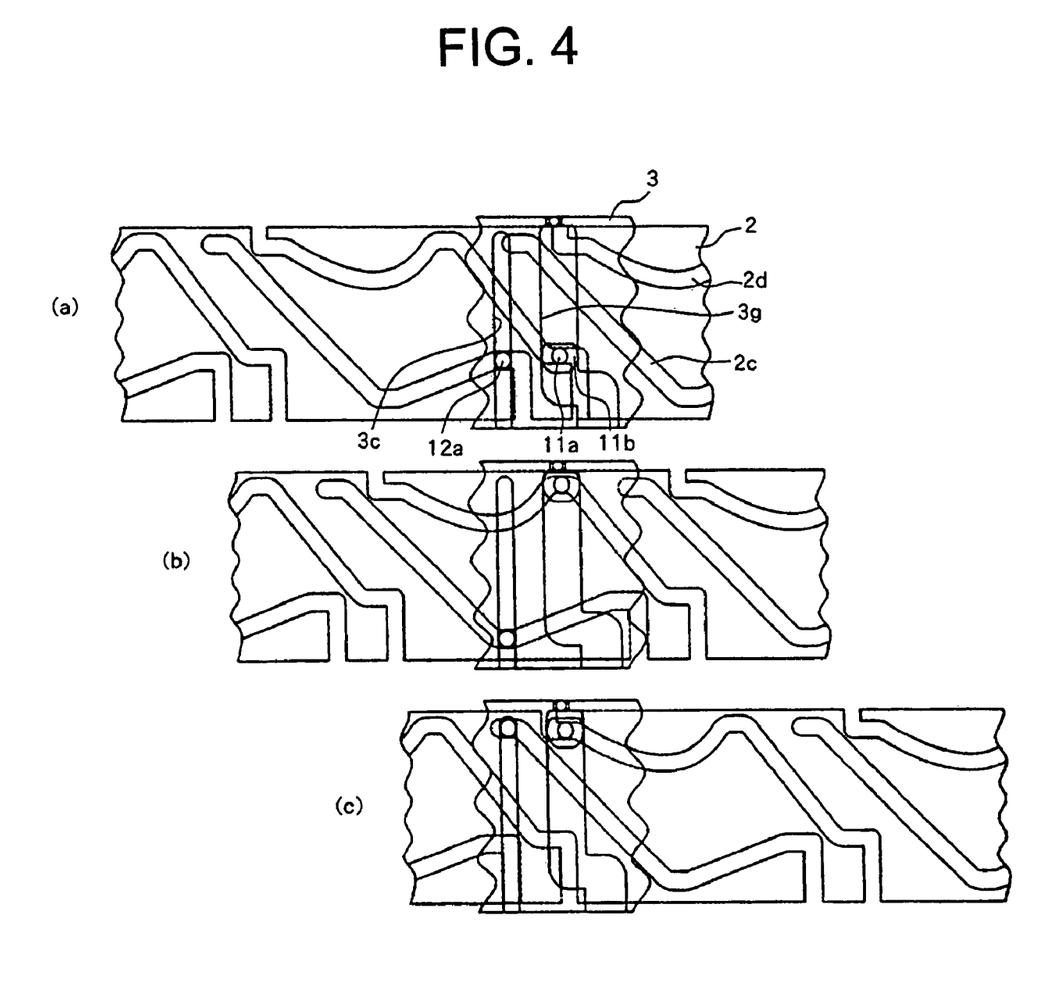
FIG. 4 illustrates the manner how the first lens unit barrel moves.

Next discussion is made on an embodiment of the present invention using FIG. 1 through FIG. 4. Now, FIG. 1 is a perspective view of a rectilinear barrel comprising the lens barrel of the present embodiment, and FIG. 2 is an exploded view in perspective of the lens barrel. FIG. 3 is a perspective view of the rectilinear barrel with the first lens unit barrel and the second lens unit barrel are assembled, and FIG. 4 illustrates the manner how the first lens unit barrel moves.

On the right side in the front surface of the camera body 60, a light-emitting window portion 62 that composes a stroboscope which irradiates the subject with an illumination light is positioned and on the left side of the light-emitting window portion 62, a finder window section 64 and a photometric window section 63 are positioned, respectively.

Furthermore, on the top of the camera body 60, a release button 65 for starting image-taking preparation action (focus detecting action and photometric action) and image-taking action (light exposure to image pickup devices such as film, CCD, CMOS sensor, etc.) is positioned.

Referring now to FIG. 2, the configuration of the entire lens barrel will be described. Numeral 1 denotes a fixed barrel, and on the inner circumferential surface of this fixed barrel 1, a cam groove portion 1a and a rectilinear groove portion 1b which extends along the optical axis direction are formed.

The cam groove portion 1a engages with a cam pin 2a positioned on the outer circumferential surface of a cam barrel 2 and the rectilinear groove portion 1b engages with a protruded portion 3a formed at a flange portion 3e disposed at a rectilinear barrel later discussed.

At the rear end of the outer circumferential surface of the cam barrel 2, a gear 2b which extends in the circumferential direction of the cam barrel 2 is disposed. The gear 2b engages with a driving gear 4 via a gear opening portion 1c formed on the fixed barrel 1.

Numerals 6 through 10 denote reduction gears and decelerate outputs of a motor 5. The driving force of the motor 5 is transmitted from the pinion gear (worm gear) 6, to the second gear 7, to the third gear 8, to the fourth gear 9, to the fifth gear 10, and then to the driving gear 4 in that order.

Numeral 3 denotes a rectilinear barrel (second barrel member) and at the front end of the outer circumferential surface of this rectilinear barrel 3, a locking protrusion 3b (see FIG. 1) is disposed, and is integral with the cam barrel 2 in the contra-rotatable condition. At the rear end of the outer circumferential surface of the rectilinear barrel 3, the flange portion 3e which extends in the circumferential direction of the rectilinear barrel is formed.

Numeral 11 denotes a first lens unit barrel (first barrel member), numeral 12 denotes a second lens unit barrel, and these lens barrels 11, 12 are housed inside the rectilinear barrel as shown in FIG. 3. Inside the first lens unit barrel 11 and the second lens unit barrel 12, image-taking lenses not illustrated, etc. are mounted.

In the first lens unit lens barrel 11, a cam pin supporting member 11b (guide portion) is formed, and on this cam pin supporting member 11b, a cam pin 11a (cam follower portion) is formed. The Cam pin supporting member 11b engages with a first lens unit groove portion 3d formed on the rectilinear barrel 3. The construction of a first lens unit groove portion 3d is shown in FIG. 1 but the detail will be described later. In the second lens unit barrel 12, a cam pin 12a is formed.

The height size (size of B shown in FIG. 1) of the flange portion 3e formed at the rear end of the outer circumferential surface of the above-mentioned rectilinear barrel 3 is set greater than a flange portion 101a of a conventional example shown in FIG. 6. Consequently, overlapping (interference) between the above-mentioned gears (third gear 8 and driving gear 4) positioned near the outer circumferential surface of the rectilinear barrel 3 and the flange portion 3e causes a problem.

In the present embodiment, this problem is solved by disposing a first outside diameter concave portion 3j to avoid overlapping with a third gear 8 and a second outside diameter concave portion 3k to avoid overlapping with the driving gear 4 at the flange portion 3e as shown in FIG. 1.

On the inner circumferential side of the flange portion 3e, an opening portion 3l is provided to allow the cam pin 11a disposed to the first lens unit barrel 11 to pass. The opening portion 3l is formed in such a manner that the phase is located between the first outside diameter concave portion 3j and the second outside diameter concave portion 3k.

Now, it can be thought that the opening portion 3l may be arranged at the position to achieve the same phase as that of the first outside diameter concave portion 3j or the second outside diameter concave portion 3k.

However, arranging the opening portion at the position of the same phase reduces the height size of the place where the opening portion 3l is formed in the flange portion 3e and decreases the strength of the flange portion 3e at the portion.

Therefore, in the present embodiment, the opening portion 3l in the circumferential direction is located between the first outside diameter concave portion 3j and the second outside diameter concave portion 3k.

Since in the portion in which the first outside diameter concave portion 3j and second outside diameter concave portion 3k are not formed, the height size B of the flange portion 3e is not reduced, even if the opening portion 3l is provided, it does not cause any problem to strength of the flange portion 3e.

In the flange portion 3e, the protruded portion 3a which engages the rectilinear groove portion 1b of the fixed barrel 1 is provided at three places in the circumferential direction as described above.

Now, as described above, the length of the height size B in the flange portion 3e is set longer than that in the conventional example. Consequently, it is no longer necessary to arrange the protruded portion 3a at the position of the phase same as that of opening portions 3f, 3l (3f will be described later) from the viewpoint of securing strength of the flange portion 3e.

As a result, the degree of positional freedom is increased from the conventional example on the flange portion 3e of the protruded portion 3a.

The cam pin 12a of the second lens unit barrel 12 engages with the second rectilinear groove portion 3c of the rectilinear barrel 3 shown in FIG. 1 and with the second cam groove portion 2c formed on the inner circumferential surface of the cam barrel 2. When the cam barrel 2 rotates around the optical axis, the second lens unit barrel 12 moves along the trajectory of the second cam groove portion 2c.

At the rear end of the second rectilinear groove portion 3c, the inner opening portion 3f formed by notching part of the inner circumference side of the flange portion 3e is disposed.

When the second lens unit barrel 12 is assembled into the rectilinear barrel 3, the cam pin 12a should be guided to the second rectilinear groove portion 3c in such a manner as to pass the opening portion 3f from the rear of the rectilinear barrel 3 (see FIG. 3).

The first lens unit groove portion 3d formed in the rectilinear barrel 3 comprises a first assembled groove portion 3i (second engaging portion) connected to the opening portion 3l, a second assembled groove portion 3h (second engaging portion) connected to the first assembled groove portion 3i, and a first rectilinear groove portion 3g (first engaging portion) connected to the second assembled groove portion 3h.

The first assembled groove portion 3i is formed in such a manner as to extend from the portion of the phase same as that of the opening portion 3l of the rectilinear barrel 3 to the optical axis direction, and the second assembled groove portion 3h is formed in such a manner as to extend in the circumferential direction of the rectilinear barrel 3, one end of which is connected to the first assembled groove portion 3i. In addition, the first rectilinear groove portion 3g extends in the optical axis direction, with its rear end connected to the other end of the second assembled groove portion 3h.

Furthermore, at the position where the first rectilinear groove portion 3g is extended in the flange portion 3e, the first outside diameter concave portion 3j is formed.

The first rectilinear groove portion 3g engages with the cam pin supporting member 11b and prevents the first lens unit barrel 11 from rotating around the optical axis when the first lens unit barrel 11 moves along the cam trajectory of the first lens unit cam groove portion 2d formed in the cam barrel 2.

The first lens unit barrel 11 is assembled inside the rectilinear barrel 3 from the rear of the rectilinear barrel 3. Specifically, assembly is completed by moving and rotating the first lens unit barrel 11 so that the cam pin supporting member 11b is moved in order of the opening portion 3l, the first assembled groove portion 3i, the second assembled groove portion 3h, and the first rectilinear groove portion 3g (see FIG. 3).

FIG. 4 shows the manner how the assembled first lens unit barrel 11 moves along the first rectilinear groove portion 3g. Now, FIG. 4a illustrates the collapsed condition, FIG. 4b the wide-angle condition, and FIG. 4c the telephotographic condition.

As shown in FIG. 4, the cam pin 12a of the second lens unit barrel 12 moves in nearly whole area of the second rectilinear groove portion 3c of the rectilinear barrel 3.

As against this, the cam pin supporting member 11b of the first lens unit barrel 11 uses the first rectilinear groove portion 3g only of the first lens unit groove portion 3d, and the first assembled groove portion 3i and the second assembled groove portion 3h are not used.

This is because the first assembled groove portion 3i and the second assembled groove portion 3h are disposed only to guide the cam pin supporting member 11b to the first rectilinear groove portion 3g.

Consequently, the first assembled groove portion 3i and the second assembled grooved portion 3h may be formed in any directions if connection to the opening portion 3l and the first rectilinear groove portion 3g can be achieved.

That is, in the present embodiment, the second assembled groove portion 3h is formed in the circumferential direction of the rectilinear barrel 3 but may be formed in any directions if the second assembled groove pin 3h can be connected to the opening portion 3l and the first rectilinear groove portion 3g.

In addition, in the present embodiment, the first assembled groove portion 3i is formed along the optical axis direction but may be formed in any directions if the first assembled groove portion 3i can be connected to the opening portion 3l and the second assembled groove portion 3h.

Furthermore, the first assembled groove portion 3i and the second assembled groove portion 3h may be made by one groove portion, and by this groove portion, the opening portion 3l and the first rectilinear groove portion 3g may be connected.

In this way, in the present embodiment, the phase of the opening portion 3l and the phase of the first rectilinear groove portion 3g are varied by bending the assembled groove portions 3i, 3h. Consequently, because the relative position (relative position in the circumferential direction of the rectilinear barrel 3) between the opening portion 3l and the first rectilinear groove portion 3g can be varied by forming the assembled groove portions 3i, 3h into various shapes, the degree of design freedom can be improved.

When the length B of the flange portion 3e is short as is the case of the conventional example (in this case, there is no need to provide the first outside diameter concave portions 3j, 3k), the strength of the lens barrel 61 must be secured, and the protruded portion 3a and the opening portion 3l must be arranged at the position of the same phase.

However, because even in such case, the relative position (relative position in the circumferential direction of the rectilinear barrel 3) between the opening portion 3l (protruded portion 3a) and the first rectilinear groove portion 3g can be varied by forming the assembled groove portions 3i, 3h into various shapes, the degree of design freedom can be improved as compared with the conventional example.

As described above, because according to the present invention, in the second lens barrel member, the first groove portion and the opening portion are formed at different positions in the circumferential direction and on the circumferential wall, the second groove portion is formed for assembling the guide portion of the first lens barrel member into the first groove portion from the position of the opening portion, the phase of the opening portion and the phase of the first groove portion can be easily varied by changing the shape of the second groove portion, and the degree of design freedom of lens apparatus can be improved.

In addition, because by forming a protruded portion, which is formed on the outer circumference of the flange portion and engages with the fourth lens barrel member, in the position different from the opening portion in the circumferential direction, there is no need of arranging the protruded portion at the position of the phase same as that of the opening portion as is the case of the conventional example, the degree of design freedom of lens apparatus can be improved.

While preferred embodiments have been described, it is to be understood that modification and variation of the present invention may be made without departing from scope of the following claims.

What is claimed is:

1. A lens apparatus comprising:
   a first member which has a guide portion guided so that the first member go straight ahead in an optical axis direction;
   a second member which is arranged outside of the first member, the second member having a circumferential wall, an engaging portion for guiding the guide portion in the optical axis direction is formed on the circumferential wall;

wherein an opening portion is formed at the end of the optical axis direction of the second member to take the guide portion in and out with respect to the second member, and in the second member, the engaging portion and the opening portion are formed at different positions in the circumferential direction, and the engaging portion and the opening portion are connected.

2. The lens apparatus according to claim 1, further comprising a flange portion is formed at the end of the optical axis direction of the second member, wherein the opening member is also formed at the flange portion.

3. An image-taking apparatus comprising:

a lens apparatus according to claim 1; and a photoelectric conversion element which photoelectrically converts an object formed by the lens apparatus.

4. An image-taking apparatus comprising:

a lens apparatus, a photoelectric conversion element which photoelectrically converts an object formed by the lens apparatus, the lens apparatus, further comprising a first barrel member which has a guide portion guided in an optical axis, a second barrel member having a circumferential wall, a first engaging portion for guiding the guide portion in the optical axis direction is formed on the circumferential wall and a flange portion is formed at the end of the optical axis direction of the circumferential wall, wherein, an opening portion is formed on the flange portion in the second barrel member, the first engaging portion and the opening portion are formed at different positions in the circumferential direction, and a second engaging portion for connecting the first engaging portion and the opening portion formed on the circumference wall.

* * * * *